Patented Aug. 18, 1931

1,819,055

UNITED STATES PATENT OFFICE

JAN AL AND FRANZ RUDOLF MOSER, OF AMSTERDAM, NETHERLANDS, ASSIGNORS TO NAAMLOOZE VENNOOTSCHAP DE BATAAFSCHE PETROLEUM MAATSCHAPPIJ, OF THE HAGUE, NETHERLANDS

DESULPHURIZATION OF GASES AND VAPORS

No Drawing. Application filed October 21, 1929, Serial No. 401,368, and in The Netherlands October 23, 1928.

It is known that sulphur compounds in gas mixtures such as hydrocarbon gases or gases containing hydrocarbon, water gas mixtures, etc. cause great inconvenience especially when it is desired to subject these gases to catalytic conversions. After a time the sulphur compounds poison the catalyst, for which reason it is necessary before conducting the gases over the catalyst to free them of sulphur compounds.

For various catalytic gas reactions, for instance the preparation of hydrogen from hydrocarbons such as natural gas and steam, in which for instance a nickel-containing contact mass is used, it is necessary, in order to prevent poisoning of the catalyst, to perform an intensive desulphurization whereby even traces of sulphur compounds are removed.

Various processes have already been proposed to achieve a more or less complete desulphurization of various gas mixtures.

It is known, for instance, to remove the bound sulphur from water gas by conducting the gases at an elevated temperature over zincoxide or zinchydroxide or over mixtures of these with copper oxide, wolfram oxide, molybdenum oxide, chromic acid, manganic oxide or iron oxide or oxides of alkali, alkaline earth or earth metals.

The sulphur compounds, which in general have to be removed, may roughly be divided into three groups, viz.:

1. Sulphuretted hydrogen;
2. The comparatively easily removable sulphur compounds, i. e. mercaptans and thioethers;
3. The sulphur compounds that are difficult to remove, to which belong especially $CS_2$ as also thiophene.

Several of these compounds can be easily removed. $H_2S$, for instance, can be fixed with a leadacetate solution whether alkaline, or not reduced copper, fixed KOH or NaOH, wet ironoxide etc.

If, for instance, steam or other gases or vapours, having a reducing action, are present in the gas mixture, the metallic or metal-oxide-containing catalysts generally used for desulphurization cause the various sulphur compounds to form sulphuretted hydrogen, which then has to be separately removed before the gases are conducted over the catalyst. The working of these desulphurizing masses is dependent on the presence of steam or some other reducing gas in the gas mixture. A material has herefore been sought capable of bringing about a practically complete desulphurization also without the presence of such gases or vapours giving rise to the formation of $H_2S$.

Now according to the invention the gases may be desulphurized by passing them at an elevated temperature over or through a contact mass containing thorium or thorium compounds more particularly thoriumoxide whether or not mixed or bound with small quantities of materials acting as a promoter.

The desulphurizing mass according to this invention has the great advantage that it can act in the absence of steam, hydrogen or other reducing gas so that no hydrogen sulphide is formed requiring separate removal from the gas. However, the said desulphurizing mass is also effective in the presence of steam, hydrogen or other reducing gas, and it can be so used in cases where the presence of hydrogen sulphide in the gas, or its separate removal therefrom, is not objectionable.

Further the mass according to this invention can be easily regenerated by conducting over it for some time reducing or oxidizing gases such as steam, hydrogen or air.

Taking for example the preparation of hydrogen from natural gas and steam with the aid of a nickel contact mass the process may be carried out in such a manner that natural gas is first conducted over the thoriumoxide mass, steam is then blown into the gasmixture, after which natural gas and steam are conducted over the nickelcatalyst.

After some time the steam may be introduced for a certain period in front of the place where the desulphurizing mass is located, whereby regeneration takes place. The resulting sulphuretted hydrogen then has to be removed before the gases are brought into contact with the nickel catalyst; this for instance, can be advantageously done with the aid of a mass consisting of iron oxide precipitated on Bayer A-carbon.

The most efficacious temperature of the desulphurizing mass according to the invention is to a certain extent dependent on the nature of the sulphur compounds to be removed. For the above mentioned preparation of hydrogen from natural gas and steam a temperature of 650° C. appeared to be very suitable. The removal of sulphuretted hydrogen either with ironhydroxide precipitated on active carbon or with the aid of a colloidal solution of ironoxide in a NaOH solution, generally takes place at a much lower temperature than the removal of the sulphur compounds by means of known desulphurizing masses, so that the gases after they have been conducted over a desulphurizing mass yielding sulphuretted hydrogen, first, have to be cooled to the said lower temperature to be subsequently heated again to the desired temperature for the preparation of hydrogen, say 600°. With the desulphurizing mass according to the invention such an intermediate cooling is not required, which means a considerable saving of heat.

By carrying out the process with, say, two desulphurizing masses working alongside each other, whereby alternately the one desulphurizes the gas mixture and the other is regenerated say, with steam, the gases conducted over the catalyst can be kept entirely free from sulphuretted hydrogen. As promotor of the thoriumoxide mass various metal oxides and/or metals come into consideration, such as magnesiumoxide, leadoxide, copper, nickel, etc.

It has been found that in using some of such promotor-containing desulphurizing masses according to the invention, also if the sulphur-containing gases contain steam, no traces of sulphuretted hydrogen are formed, or if any, not until after a long time.

A very favourable desulphurizing action is performed by a mass containing according to the invention, besides thoriumoxide, a small quantity (a few per cent) of copper and nickel. With such a mass practically all sulphur compounds were removed from natural gas at 650° C., whereby also in the presence of steam there was no sulphuretted hydrogen formation for a very long time.

It goes without saying that the invention comprises all forms in which the desulphurizing mass can be applied, for instance mixed with or precipitated on pumicestone, diatomaceous earth, active carbon, etc.

What we claim is:

1. A process for desulphurizing gases free from constituents causing formation of hydrogen sulphide at reaction temperature, characterized by conducting the gas at an elevated temperature into the presence of a contact mass consisting primarily of a thorium containing substance as the effective desulphurizer.

2. A process for desulphurizing gases free from constituents causing formation of hydrogen sulphide at reaction temperature, characterized by conducting the gas at an elevated temperature into the presence of a contact mass consisting primarily of a thorium containing substance and a promotor as the effective desulphurizer.

3. A process for desulphurizing gases free from constituents causing formation of hydrogen sulphide at reaction temperature, characterized by conducting the gas at an elevated temperature into the presence of a contact mass consisting primarily of thorium oxide as the effective desulphurizer.

4. A process for desulphurizing gases free from constituents causing formation of hydrogen sulphide at reaction temperature, characterized by conducting the gas at an elevated temperature into the presence of a contact mass consisting of thorium oxide as the effective desulphurizer together with copper oxide as a promoter.

5. A process for desulphurizing gases free from constituents causing formation of hydrogen sulphide at reaction temperature, characterized by conducting the gas at an elevated temperature into the presence of a contact mass consisting of thorium oxide as the effective desulphurizer together with nickel oxide as a promoter.

6. A process for desulphurizing gases characterized by conducting the gas at an elevated temperature into the presence of a contact mass consisting primarily of a thorium containing substance as the effective desulphurizer.

7. A process for desulphurizing gases free from constitutents causing formation of hydrogen sulphide at reaction temperature, characterized by conducting the gas at an elevated temperature into the presence of a contact mass consisting primarily of a thorium containing substance as the effective desulphurizer and regenerating the said substance with a reducing gas.

8. A process for desulphurizing gases characterized by conducting the gas at an elevated temperature into the presence of a contact mass consisting primarily of a thorium containing substance as the effective desulphurizer and regenerating the said substance with a reducing gas.

9. A process for desulphurizing gases free from constituents causing the formation of hydrogen sulphide at reaction temperature, characterized by conducting portions of the gas in successive alternation into the presence of separate contact masses each consisting primarily of a thorium containing substance as the effective desulphurizer and regenerating each contact mass during the stages when the gas is reacting with another contact mass.

10. A process for desulphurizing gases characterized by conducting the gas in successive alternations into the presence of separate contact masses each consisting primarily of a thorium containing substance as the effective desulphurizer, and regenerating each contact mass during the stages when the gas is reacting with another contact mass.

11. A process for desulphurizing gases characterized by the gas being conducted at an elevated temperature into the presence of a contact mass consisting primarily of a thorium contact substance as the effective desulphurizer, regenerating the said substance with a mixture of the gas and a reducing gas, and treating the gas mixture from the regeneration stage to separate hydrogen sulphide from the same.

In testimony whereof we have affixed our signatures.

JAN AL.
FRANZ RUDOLF MOSER.